United States Patent [19]

Stamp

[11] Patent Number: 4,899,979
[45] Date of Patent: Feb. 13, 1990

[54] BLEEDER VALVE ASSEMBLY

[75] Inventor: George W. Stamp, Hartlepool, England

[73] Assignee: Davy McKee (Stockton) Limited, Stockton-on-Tees, England

[21] Appl. No.: 179,032

[22] Filed: Apr. 7, 1988

[30] Foreign Application Priority Data

Apr. 10, 1987 [GB] United Kingdom ............... 8708653

[51] Int. Cl.[4] ............................................ F16K 31/122
[52] U.S. Cl. ........................................ 251/58; 251/75; 251/229; 251/279; 251/299; 74/471 R; 74/470
[58] Field of Search ............... 251/58, 75, 229, 279, 251/280, 299, 232, 56; 74/470, 471 R, 515

[56] References Cited

U.S. PATENT DOCUMENTS

| 914,744 | 3/1909 | McDowell | 251/58 |
|---|---|---|---|
| 1,295,638 | 2/1919 | Triggs | 251/75 |
| 1,357,960 | 11/1920 | Cruse | 251/75 |
| 1,926,513 | 9/1933 | Clamer | 251/58 |
| 2,121,707 | 6/1938 | McGee | 251/299 |
| 2,238,814 | 4/1941 | Kneass, Jr. | 251/56 |
| 2,488,125 | 11/1949 | Hungate | 251/75 |
| 2,814,310 | 11/1957 | Lower | 251/75 |
| 2,850,259 | 9/1958 | Larson | 251/299 |
| 3,037,737 | 6/1962 | Konemund et al. | 251/58 |
| 3,277,794 | 10/1966 | Diolot | 251/58 |
| 4,103,495 | 8/1978 | Graham | 251/299 |
| 4,158,367 | 6/1979 | Mailliet | 74/470 |
| 4,280,681 | 7/1981 | Harris | 251/56 |
| 4,288,060 | 9/1981 | Mittell | 251/56 |
| 4,573,661 | 3/1986 | Chapman | 251/58 |

FOREIGN PATENT DOCUMENTS

| 2253965 | 7/1975 | France . |
| 69053 | 12/1973 | Luxembourg . |
| 602968 | 6/1948 | United Kingdom . |
| 718532 | 11/1954 | United Kingdom . |
| 1523578 | 9/1978 | United Kingdom . |

Primary Examiner—George L. Walton
Attorney, Agent, or Firm—Lee, Mann, Smith, McWilliams & Sweeney

[57] ABSTRACT

A valve assembly has a valve lid assembly which can be fitted in sealing relation on a valve seat, an over-center device can serve to force the lid on to the seat; a drive shaft connected to the lid assembly and drive means for rotating the shaft to open and close the valve seat, the over-center device serving to oppose rotation of the shaft up to a critical position whereupon the device assists in rotation of the shaft to open the valve seat.

4 Claims, 2 Drawing Sheets

BLEEDER VALVE ASSEMBLY

This invention relates to a bleeder valve assembly of the type comprising a valve seat with a removable lid which can be fitted in sealing relation on the valve seat. A fluid-operated piston-cylinder device normally operates to lift the lid from the seat and to replace the lid on the seat to thereby control the pressure of fluid in the apparatus to which the assembly is fitted. In the event of a malfunction preventing the piston-cylinder device from lifting the lid from the valve seat, the pressure of the fluid in the apparatus must be allowed to raise the lid to quickly lower the pressure in the apparatus.

According to the present invention, a valve assembly comprises a valve seat; a valve lid which can be fitted in sealing relation on the valve seat, said lid forming part of a lid structure pivotally secured to an arm mounted on a rotatable shaft; an over-centre spring device arranged to apply a force to the shaft to rotate the shaft and drive means arranged to rotate the shaft; the arrangement being such that, with the valve lid fitted on the seat, the spring device acts to urge the shaft in the direction to seal the lid on the seat and, when the shaft is rotated in the direction to displace the lid from the seat, the rotation of the shaft is opposed by the spring device until the over-centre position is exceeded whereupon the spring device assists in the rotation of the shaft.

The drive means is conveniently a hydraulic or a pneumatic cylinder which acts through a lever arm on the shaft. The cylinder is a double-acting cylinder which enables the shaft to be rotated in both directions of rotation.

The over-centre spring device is conveniently connected to an arm connected to the shaft and it provides a "snap-action" when the lid is lifted from the valve seat beyond the over-centre position of the device. When the lid is fitted on the valve seat the spring device serves to urge the shaft in the direction to force the lid device into sealing relation with the valve seat.

In order that the invention may be more readily understood, it will now be described, by way of example only, with reference to the accompanying drawings, in which.

Figure 1:
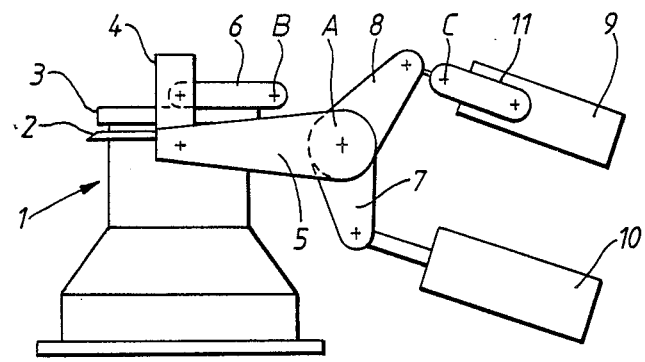
FIG. 1 is a side elevation of the valve assembly in its closed position.

A valve assembly 1 is fitted on to a device, such as a furnace, the details of which are not shown. The valve assembly has a spherical valve seat 2 on which a valve lid 3 can be fitted to form a sealing relation therewith.

In the arrangement shown, the valve lid 3 is in the form of a disc which is pivotally mounted within a U-shaped frame 4. A lever 5 secured at one end to a rotatable shaft A is pivotably connected at its opposite end to one side of the U-shaped frame 4. A hydraulic or pneumatic piston-cylinder device 10 is trunnion mounted and its piston rod is connected to one end of a link 7 secured at its other end to the shaft A. Thus, when the piston cylinder device, which is a double-acting device, is actuated, the lid is raised and lowered with respect to the seat of the valve assembly. A further link 6 is pivotally connected to the frame 4 and to a pivot point B and this link causes the lid structure 3 to pivot about point B when it is raised and lowered by the rotation of the shaft A.

Figure 2:
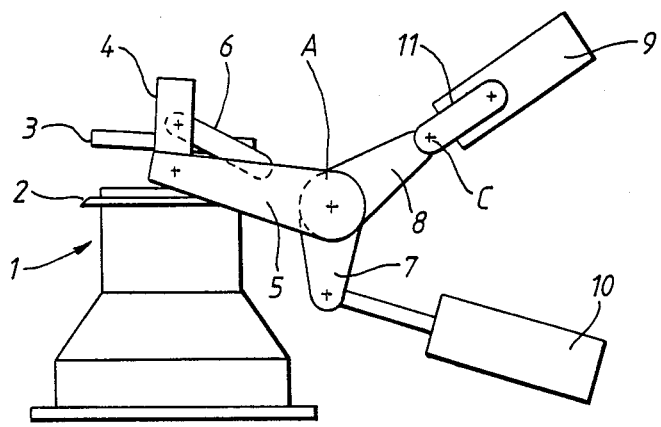
FIG. 2 is a side elevation of the valve position with the lid partly opened.
Figure 3:
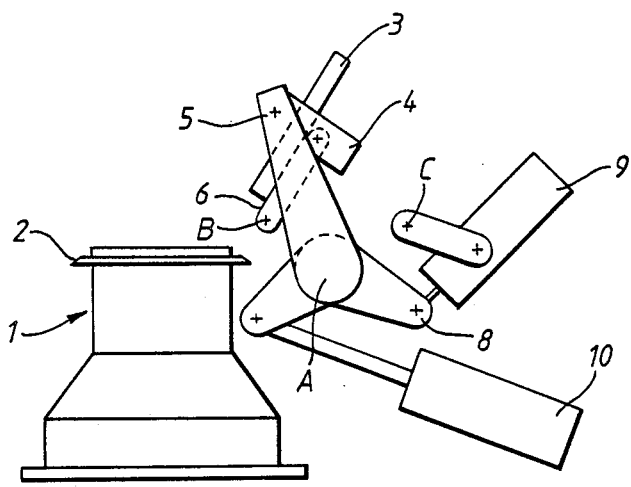
FIG. 3 is a side elevation of the valve assembly with the lid fully open.

A further link 8 secured at one end to the shaft A is pivotally connected at its opposite end to a spring device 9 which is mounted in a pair of pivotable links 11 which are secured to a pivot axis C. In the arrangement shown in FIG. 1, the action of the spring in the housing of the device is urging the arm 8 in the anti-clockwise direction to force the lid firmly on to the valve seat. When the piston cylinder device 10 is actuated to force out the piston rod, rotation of the shaft A occurs and the arm 5 is rotated in the clockwise direction to displace the lid 3 from the seat of the valve. When the lid is first displaced, the action of the spring device 9 is such as to oppose the rotation of the shaft but, at the position shown in FIG. 2, the line of action of the spring device is aligned with the axis of the arm 8, this being known as the over-centre position. Further movement of the shaft A in the clockwise direction causes the spring device 9 to pass through the over-centre position and it then bears upon the arm 8 to rotate the shaft in the clockwise direction. The continuing movement of the lid is thus as a result of the action of the spring device acting in concert with the piston-cylinder device. In FIG. 3 the valve assembly is shown in its fully open position where the lid 3 is sufficiently far away from the valve seat as not to impede the flow of gases from the apparatus to which the valve assembly is fitted.

In use, therefore, the valve lid is normally opened and closed by the piston-cylinder device 10 acting through the shaft A and the arm 5 on to the lid structure 4 to relieve over pressure in the apparatus to which the valve is fitted. The pressure in the apparatus is detected by sensors (not shown) which serve to control the device 10. In the event of power failure to the piston-cylinder device, over pressure in the apparatus to which the valve is fitted is relieved by the increase in pressure lifting the lid against the action of the spring device sufficiently to allow the over pressure to be reduced. When the over pressure is reduced, the lid will then return to its position on the seat. In the event of a massive over pressure, the lid is displaced to the fully open position shown in FIG. 3 by the action of the pressure lifting the lid through the over-centre position and thereafter the spring pressure fully opens the lid.

I claim:

1. A valve assembly comprising a valve seat, a lid structure including a valve lid which can be fitted in sealing relation on the valve seat, a lever arm, said lid structure being secured towards one end on said arm, said arm being mounted to rotate on a rotatable shaft longitudinally remote from the lid structure, an over-center spring device having an over-center position and being arranged to apply a force to the shaft to rotate the shaft, and drive means arranged to rotate the shaft; the arrangement of said valve assembly being such that, with the valve lid fitted on the seat, the spring device urges the shaft in a direction to seal the lid on the seat and, when the shaft is rotated in a direction to displace the lid from the seat, the rotation of the shaft is opposed by said spring device until said over-center position is exceeded whereupon the spring device assists in the rotation of the shaft; and in which the lid structure is secured to the arm by first pivot means and is further secured to an elongate link by second pivot means at a point spaced from the first pivot means, said link being mounted to rotate about a fixed pivot axis spaced from the shaft so that during displacement the lid structure is raised essentially upwardly from the valve seat and upon continued rotation of the lever arm the lid structure is then pivoted away from the valve seat.

2. An assembly according to claim 1 in which said arm includes a pair of arms spaced one from the other to rotate about the common axis of said shaft, said link includes a pair of links spaced one from the other to rotate about said fixed pivot axis, and said lid structure includes a U-shaped frame under which said valve lid is rigidly fastened.

3. An assembly according to claim 2 in which said spring device comprises a housing, a spring acting between the housing and a lever arm mounted on said shaft, and a pair of links pivotally secured to the housing and to a further fixed pivot axis.

4. An assembly according to claim 1 in which said spring device comprises a housing, a spring acting between the housing and a lever arm mounted on said shaft, and a pair of links pivotally secured to the housing and to a further fixed pivot axis.

* * * * *